(12) United States Patent
Kubo

(10) Patent No.: US 7,324,136 B2
(45) Date of Patent: Jan. 29, 2008

(54) ELECTRONIC CAMERA, AND IMAGE DISPLAY METHOD AND IMAGE RECORDING METHOD THEREFOR

(75) Inventor: Naoki Kubo, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 842 days.

(21) Appl. No.: 10/173,827

(22) Filed: Jun. 19, 2002

(65) Prior Publication Data

US 2002/0196348 A1 Dec. 26, 2002

(30) Foreign Application Priority Data

Jun. 22, 2001 (JP) .............................. 2001-189844

(51) Int. Cl.
*H04N 5/225* (2006.01)
(52) U.S. Cl. .............................. 348/220.1; 348/221.1; 348/333.04; 386/120; 386/121
(58) Field of Classification Search ............. 348/222.1, 348/220.1, 363, 229.1, 333.01, 207.1, 224.1, 348/208.11, 208.12, 208.15, 333.05, 231.99; 386/108, 121, 120; 352/216
See application file for complete search history.

(56) References Cited

U.S. PATENT DOCUMENTS

| | | | |
|---|---|---|---|
| 4,750,041 A * | 6/1988 | Vogel et al. .............. | 348/220.1 |
| 4,819,059 A * | 4/1989 | Pape ........................ | 348/220.1 |
| 5,589,943 A * | 12/1996 | Kozuki et al. .............. | 386/121 |
| 5,835,663 A * | 11/1998 | Momochi .................... | 386/61 |
| 6,037,972 A * | 3/2000 | Horiuchi et al. .............. | 348/64 |
| 6,117,958 A * | 9/2000 | Ittel et al. .................... | 526/161 |
| 6,169,574 B1 * | 1/2001 | Noguchi et al. .......... | 348/208.16 |
| 6,243,531 B1 * | 6/2001 | Takeuchi et al. ............ | 386/108 |
| 6,542,194 B1 * | 4/2003 | Juen ............................ | 348/367 |
| 7,092,023 B2 * | 8/2006 | Hayashi ................. | 348/333.05 |
| 2001/0015760 A1 * | 8/2001 | Fellegara et al. ...... | 348/333.01 |
| 2003/0189647 A1 * | 10/2003 | Kang .................... | 348/207.99 |

FOREIGN PATENT DOCUMENTS

| JP | 7-203288 | | 8/1995 |
|---|---|---|---|
| JP | 10-108121 | | 4/1998 |
| JP | 2001111934 A | * | 4/2001 |

* cited by examiner

*Primary Examiner*—Ngoc-Yen Vu
*Assistant Examiner*—Gregory V Madden
(74) *Attorney, Agent, or Firm*—Sughrue Mion, Pllc.

(57) ABSTRACT

The electronic camera, and image display method and image recording method applied thereto are capable of eliminating discontinuity in moving image caused by a camera control such as interruption by still image recording in moving image capturing and aperture switching. With respect to the period during which the capturing of the image data of moving image is interrupted, an image picked-up immediately before the interruption is repeatedly displayed or recorded. As to the moving image recording, supplementary recording for non-recording period may be performed afterward by utilizing an image immediately after resuming the reading of movie image. Moreover, display of non-image screen ("non-display"), recording of black screen ("black recording") or display or recording of a special image can be inserted if necessary, thus giving an impression that the shutter is clicked.

42 Claims, 13 Drawing Sheets

ELECTRONIC CAMERA, AND IMAGE DISPLAY METHOD AND IMAGE RECORDING METHOD THEREFOR

BACKGROUND OF THE INVENTION

1. Field of the Invention

The present invention relates to moving image display and recording technology applied to electronic cameras such as digital cameras, and more specifically to a technology which removes discontinuity in a moving image in the case where a still image is captured or aperture setting is changed while displaying or recording the moving image.

2. Description of the Related Art

Japanese Patent Application Publication No. 7-203288 discloses an image pickup apparatus, which has a high-resolution image-capturing mode and a standard-resolution image-capturing mode, and controls the switching of opening diameters of the apertures in accordance with a selected image-capturing mode.

However, if this image pickup apparatus employs an aperture mechanism (turret-type) in which multiple apertures having different opening diameters are formed on a movable aperture plate, the image-capturing optical path is temporarily blocked when the apertures are switched. An image immediately after the image-capturing modes are switched is thereby blocked, thus causing a defect of discontinuity in the moving image.

FIGS. 11 and 12 will be referred to for explanation. As shown in FIG. 11, a light transmitted through a lens 100 of a camera is subjected to light amount adjustment by an aperture 102, and then enters an image pickup device 104. The turret-type aperture mechanism has a structure that, as shown in FIG. 12, multiple apertures 112 having different opening diameters are formed on an aperture plate 110, and the aperture plate 110 rotationally moves about an axis 114 to selectively arrange one of the apertures 112 on the optical axis. During rotation of the aperture plate 110 for switching from a small aperture to a large aperture (or vice versa), the light is blocked by the aperture plate 110 and a period of non-capturing of moving image data is generated.

FIG. 13 is a timing chart showing this phenomenon. The image pickup device is driven in synchronization with a vertical drive signal (VD) corresponding to a video rate that defines reproduction timing. It is assumed that the aperture is initially set to "small aperture", and movie exposure is performed during 1V period, then movie display or movie recording during the next 1V period is performed with data captured by the movie exposure.

If the apertures are switched from "small aperture" to "large aperture" with a drive timing shown as Ta in FIG. 13, the light is blocked by the aperture plate 110 during the driving period (Ta), and therefore, the data is missing from the image pickup device 104. Accordingly, during the next 1V period, the display is held in "non-display" condition (blackout). With respect to the recording process, there is a case where the black display is recorded during the period (recording method A) and another case where the data during the period is not recorded and the prior and subsequent data items are connected (recording method B). In both cases, the moving image discontinues, thus resulting in visually undesirable, unnatural reproduction of images.

After the 1V period shown as Ta in FIG. 13, the switching operation of the apertures is finished at the beginning of the next 1V period, and therefore, image data is normally captured from the image pickup device 104. In other words, with the image data captured by exposure after finishing the aperture changing operation, the movie display or movie recording is performed at the next vertical drive timing. Since the opening diameter of the aperture becomes larger, the image pickup light amount is increased. Accordingly, discontinuity of luminance in the moving image occurs before and after the aperture switching.

In the image pickup apparatus disclosed in Japanese Patent Application Publication No. 7-203288, the apertures are switched in response to switching of the image-capturing modes. However, a similar problem as described above occurs not only in the case where the image-capturing modes are switched, but also in the case where the apertures are switched in the same image-capturing mode.

There is a possibility that discontinuity in the moving image occurs not only when switching the apertures as described above, but also occurs when a still image is captured while capturing (recording) the moving image. Japanese Patent Application Publication No. 10-108121 discloses an electronic camera capable of recording both moving image and still image, in which if an instruction for recording a still image is given during recording of a moving image, image information from an image pickup device is temporarily stored in a buffer device in synchronization with the recording instruction, and after the recording process by a moving image recording device is finished, the image information (still image) stored in the buffer device is recorded on a recording medium. In this camera, a high priority is given to the moving image recording process and still image data is retained in the buffer, and therefore, the problem of discontinuity in the moving image does not occur. However, in a digital camera equipped with general multipixel CCD, the drive of the still image is performed while the drive of the moving image is suspended, and therefore, the blackout condition is generated during the period of capturing the still image. Especially, in the image pickup device using a mechanical shutter, the blackout condition becomes serious if the capturing of the still image takes a long time. The number of pixels in an image pickup device mounted to the digital camera has recently been increased and a device is developed which performs the capturing of still image with an enormous number of pixels up to several millions. Accordingly, since processes for still image capturing require some time, such problem has come to the surface.

FIG. 14 is referred to for explanation. The image pickup device is driven in synchronization with the vertical drive signal (VD). During the movie display, image data is read from the image pickup device within 1V period and the display or recording of the image data is carried out in the next 1V period. If an instruction for recording a still image is input while the movie display is performed, the drive for capturing the still image is carried out for several V periods. (In FIG. 14, capturing of the still image is carried out for 3V period, but in some cases the period will be longer.) Since it is impossible to acquire image data necessary for moving image display during the period of capturing the still image, the moving image display indicates "non-display (blackout)". When capturing of the still image is finished and movie capturing is resumed, the movie display is also resumed in synchronization with the next vertical drive signal.

The same thing can be the for movie recording. During the period of non-reading of moving image data, there is a case where the black display is recorded during the period (recording method A) and another case where the moving image data during the period is not recorded and the prior and subsequent data items are connected after resuming data acquisition (recording method B). Both cases result in visually undesirable, unnatural reproduction of images.

SUMMARY OF THE INVENTION

The present invention has been developed in view of the above-described circumstances, and its object is to provide an electronic camera, and an image display method and image recording method applied thereto capable of eliminating discontinuity in moving images caused by camera control such as interruption of still image recording in capturing of moving images or aperture switching.

To achieve the above-described object, the present invention is directed to an electronic camera, comprising: an image pickup device which converts an optical image into an electric signal; a signal processing device which converts image data read from the image pickup device into a display signal and outputs the display signal to an image display device; and a display control device which causes the image display device to display a moving image based on the image data obtained by driving the image pickup device at a predetermined period, and in case of occurrence of a period during which any image data of the moving image is not obtained in display operation of the moving image, causes the image display device to repeatedly display a picked-up image obtained immediately before.

According to the present invention, if the capturing of the moving image data is interrupted, the picked-up image immediately before the interruption is displayed in a so-called freeze condition. Therefore, display of a blackout (non-image screen) condition on the display screen during the period of interruption can be avoided and unnaturalness in the movie display can be eliminated.

Preferably, the display control device inserts a non-image screen of one or more frame periods after the repeated display. As the non-image screen, a single-color screen such as black screen and blue screen may be available.

Preferably, the electronic camera further comprises: a special image storing device which stores data of a special image to be displayed on the image display device instead of the moving image in case of occurrence of a period during which any image data of the moving image is not obtained, wherein the display control device causes the image display device to display the special image stored in the special image storing device for one or more frame periods after the repeated display.

An aspect may be available in which the predetermined special image prepared in advance is inserted instead of the above-described non-image screen. As the special image, for example, an image suggesting that a shutter is clicked (still image recording is performed) may be used.

The present invention is also directed to an electronic camera, comprising: an image pickup device which converts an optical image into an electric signal; a signal processing device which converts image data read from the image pickup device into a display signal and outputs the display signal to an image display device; a display control device which causes the image display device to display a moving image based on the image data obtained by driving the image pickup device at a predetermined period; and a special image storing device which stores data of a special image to be displayed instead of the moving image in case of occurrence of a period during which image data necessary for displaying the moving image is not obtained, wherein the display control device causes the image display device to display the special image stored in the special image storing device in case of occurrence of a period during which the image data of the moving image is not obtained in display operation of the moving image.

There is not only an aspect in which the special image held in advance is displayed in a part of the period during which capturing the moving image data is interrupted, but also an aspect in which the special image is displayed during the whole period of interruption.

The above-described display control technology can be applied to the recording control. Then, the present invention is also directed to an electronic camera, comprising: an image pickup device which converts an optical image into an electric signal; a recording processing device which converts image data read from the image pickup device into recording data and records the recording data on a recording medium; and a recording control device which controls the recording processing device to record a moving image on the recording medium, the moving image being shown by the image data obtained by driving the image pickup device at a predetermined period, and in case of occurrence of a period during which any image data of the moving image is not obtained in capturing the moving image, to cause the recording processing device repeatedly record a picked-up image obtained immediately before.

According to the present invention, with respect to the period during which capturing of the moving image data is interrupted, the picked-up image immediately before the interruption is repeatedly recorded. Therefore, in reproducing the moving image, a blackout (non-image screen) condition on the reproduction display screen during the period of interruption can be avoided and unnaturalness in the movie display can be eliminated.

Preferably, the recording control device performs control to record a non-image screen of one or more frame periods after the repeated recording. In another aspect, a special image is inserted and recorded instead of the non-image screen are also preferable. Moreover, an aspect may be available in which the special image is inserted during the whole period of interruption.

According to an aspect of the present invention, when the period during which any image data of the moving image is not obtained expires and obtaining the image data of the moving image is resumed, the recording control device performs control to repeatedly record a picked-up image immediately after resumption of obtaining the image data for one or more frame periods including the last frame of the period during which any image data of the moving image is not obtained.

With respect to the period during which capturing of the moving image data is interrupted, by inserting a picked-up image immediately before the interruption and a picked-up image immediately after resuming the obtaining of the moving image data into the interruption period and recording them, discontinuity in the moving image can be eliminated. Furthermore, an aspect is also preferred in which a non-image screen (or special image) of one frame or more is inserted and recorded in the middle of the picked-up image immediately before the interruption and the picked-up image immediately after the resumption that have been inserted.

Moreover, the present invention is also directed to an electronic camera, comprising: an image pickup device which converts an optical image into an electric signal; a recording processing device which converts image data read from the image pickup device into recording data and records the recording data on a recording medium; and a recording control device which controls the recording processing device to record a moving image on the recording medium, the moving image being shown by the image data obtained by driving the image pickup device at a predetermined period, and in case of occurrence of a period during which any image data of the moving image is not obtained in capturing the moving image, with respect to the moving image recording for the period, causing the recording processing device repeatedly record a picked-up image immediately after resumption of obtaining the image data of the moving image for one or more frame periods including a last frame period of the period during which any image data of the moving image is not obtained.

With respect to the moving image recording for the period during which capturing of the moving image data is interrupted, by repeatedly recording a picked-up image immediately after resuming the obtaining of the moving image data afterward, instead of utilizing a picked-up image immediately before the interruption, the discontinuity in the moving image can also be eliminated.

As a state where the period during which the moving image data is not obtained occurs, there is a case where interruption processing by still image capturing is performed in capturing the moving image, and a case where an aperture is changed in capturing the moving image. The present invention is also directed to an image display method and an image recording method applied to the above-described electronic camera.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
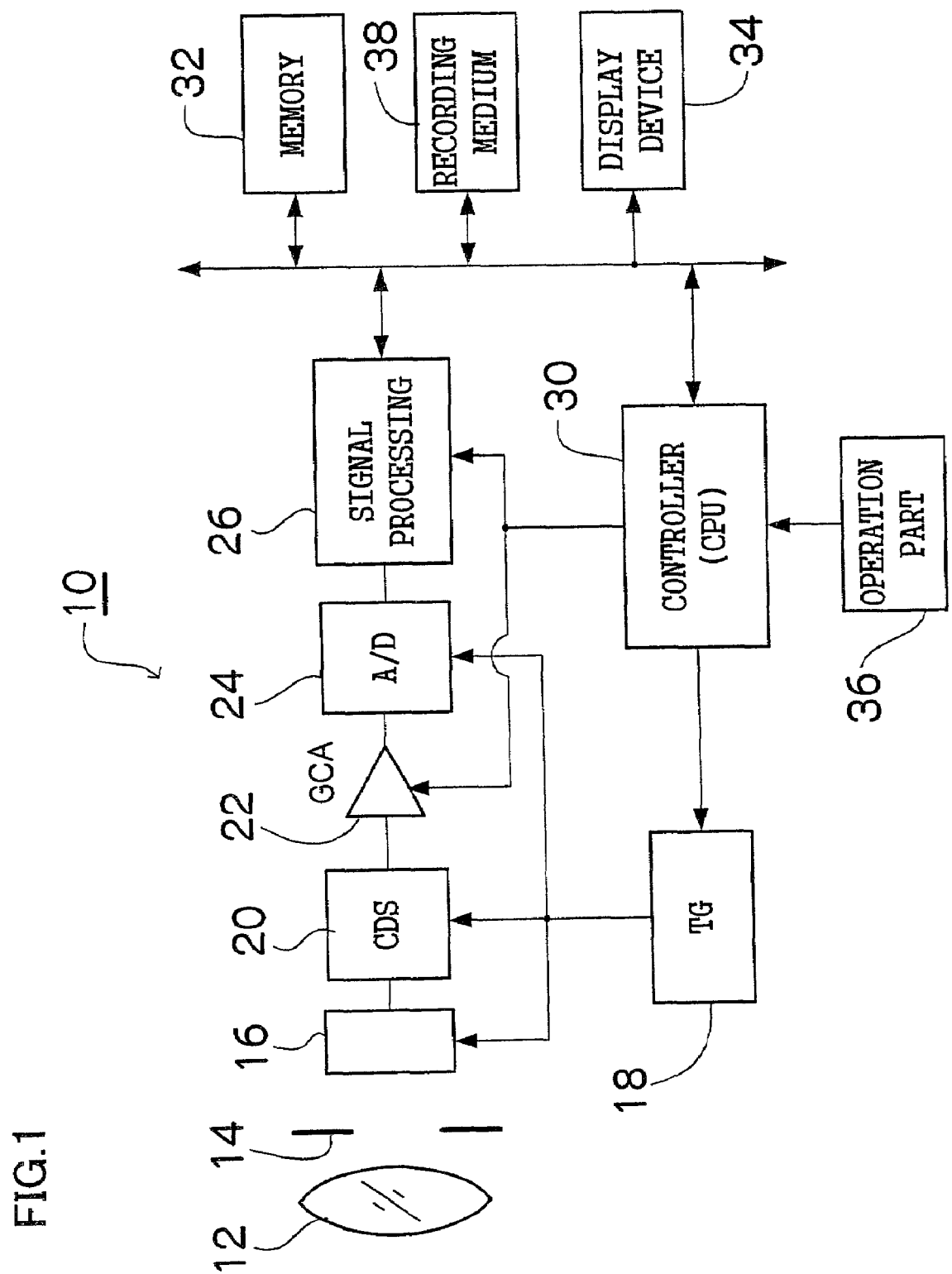
FIG. 1 is a block diagram showing a digital camera according to an embodiment of the present invention.

A preferred embodiment of the present invention will be described below with reference to the accompanying drawings. FIG. 1 is a block diagram showing a digital camera according to an embodiment of the present invention. A taking lens 12 of a camera 10 comprises one or more lenses, which may be a lens with a single focal length (fixed focus) or the one with variable focal length, like a zoom lens. Light transmitted through the taking lens 12 undergoes light amount adjustment by an aperture 14, and then enters an image pickup device 16. As the image pickup device 16, various devices, such as a CCD image sensor and CMOS sensor, may be applied.

A light-receiving surface of the image pickup device 16 has a structure in which multiple photosensors are arranged in the same plane, and a subject image formed on the light-receiving surface of the image pickup device 16 is converted into a signal charge whose amount corresponds to the amount of the incident light by each photosensor. The signal charges accumulated in this way are read in accordance with a timing pulse provided from a timing generator (TG) 18, and then sequentially output as a voltage signal (image signal) corresponding to the signal charge. The image pickup device 16 has so-called electronic shutter function for controlling accumulation time (shutter speed) of the charges accumulated in each photosensor.

The image signal read from the image pickup device 16 is transmitted to a CDS circuit 20, where the signal is subjected to signal processing such as correlated double sampling processing and color separation processing, and then a signal level of each color signal is adjusted by a gain control amplifier (GCA) 22.

An output signal from the GCA 22 is converted into a digital signal by an A/D converter 24 and transmitted to a signal processing part 26. The TG 18 provides a timing signal to the image pickup device 16, CDS circuit 20 and A/D converter 24 according to a command from a controller 30, and these circuits synchronize with one another according to the timing signal. The controller 30 controls the gain of the GCA 22 and operation of the signal processing part 26.

The signal processing part 26 is composed of a digital signal processor (DSP) including a luminance/color-difference signal generation circuit, gamma correction circuit, sharpness control circuit, contrast correction circuit, white balance correction circuit and compression-decompression circuit, and processes the image signals in accordance with a command from the controller 30.

Image data input to the signal processing part 26 is converted into a luminance signal (Y signal) and color-difference signal (Cr, Cb signal), subjected to predetermined processes such as gamma correction, and stored in a memory 32.

In case of outputting for displaying a captured image, the image data stored in the memory 32 is read in accordance with the command from the controller 30, converted into a predetermined signal form for display, and output to a display device 34. As the display device 34, a liquid crystal display provided on the camera 10 or an external image display device connected through a cable or other signal transmission device may be used. Thus, image contents of the image data are displayed on a screen of the display device 34.

The image data in the memory 32 is rewritten by the image signal output from the image pickup device 16 at regular intervals and a video signal generated from the image data is supplied to the display device 34, whereby the image input through the image pickup device 16 is displayed as a moving image on the display device 34 in real time.

The operator can confirm the image-capturing angle of view by looking at the screen of the display device 34 or optical finder not shown in the figure. The camera 10 is a digital camera capable of recording and reproducing still image and moving image, and also capable of selecting any of a still image capturing mode, moving image capturing mode and reproduction mode by a mode selection device included in an operation part 36. In addition to the mode selection device, the operation part 36 includes an instruction input device such as a release button, cross button and menu button. The release button is used as a button for instructing the still image recording and doubles as a button for starting/stopping of moving image recording. It is possible, of course, to provide the instruction button for the still image recording and that for the moving image recording separately.

In case of still image recording, by press-down operation of the release button, a recording instruction signal is generated and capturing of recording image data (exposure and data reading) is started in response to acceptance of the instruction signal. The captured image data is compressed in the compression-decompression circuit of the signal processing part 26 according to a predetermined method such as JPEG and recorded in a recording medium 38. In case of moving image recording, the recording operation is started by press-down operation of the release button, and the recording operation is stopped by pressing down the release button again. The period of time for recording may be set in advance to allow the moving image capturing within the set period of time to be performed by a single press-down operation of the release button. It is also possible to perform the recording operation during the period of continuously pressing down the release button, and to stop the recording operation by halting pressing down the button.

The recording medium 38 may be any of various types of media such as Smart Media (Solid-State Floppy Disk Card), PC card, Compact Flash, magnetic disk, optical disk, magneto-optical disk and memory stick, and a signal processing device and interface suitable for the employed medium are applied. It may be possible to have a configuration in which multiple media can be mounted, whether they are the same type or different type. Moreover, the recording medium 38 is not limited to the removable medium, and it may be a recording medium incorporated in the camera 10 (internal memory). In case of saving the image in the internal memory, a communication interface is provided for transferring the data to an external device such as a personal computer.

If the reproduction mode is set by the mode selection device of the operation part 36, image data is read from the recording medium 38, subjected to necessary signal processing such as decompression processing, and is output to the display device 34.

The controller 30 is a control part performing centralized control of each circuit of this camera system, which includes a central processing device (CPU) and its peripheral circuits. Based on an input signal received from the operation part 36, the controller 30 controls the operation of relevant circuits, as well as performing autofocus (AF) control, autoexposure (AE) control, display control of the display device 34, recording control and the like. In other words, based on the image signal output from the image pickup device 16, the controller 30 performs various computations such as AF evaluation value computation and AE computation, and then controls a lens driving part not shown in the figure to move the taking lens 12 to a focusing position based on the computation result, controls an aperture driving part not shown in the figure to set an appropriate aperture, and controls the charge accumulation time of the image pickup device 16 at the same time.

The operation of the camera 10 with the above-described configuration will be explained.

Figure 2:
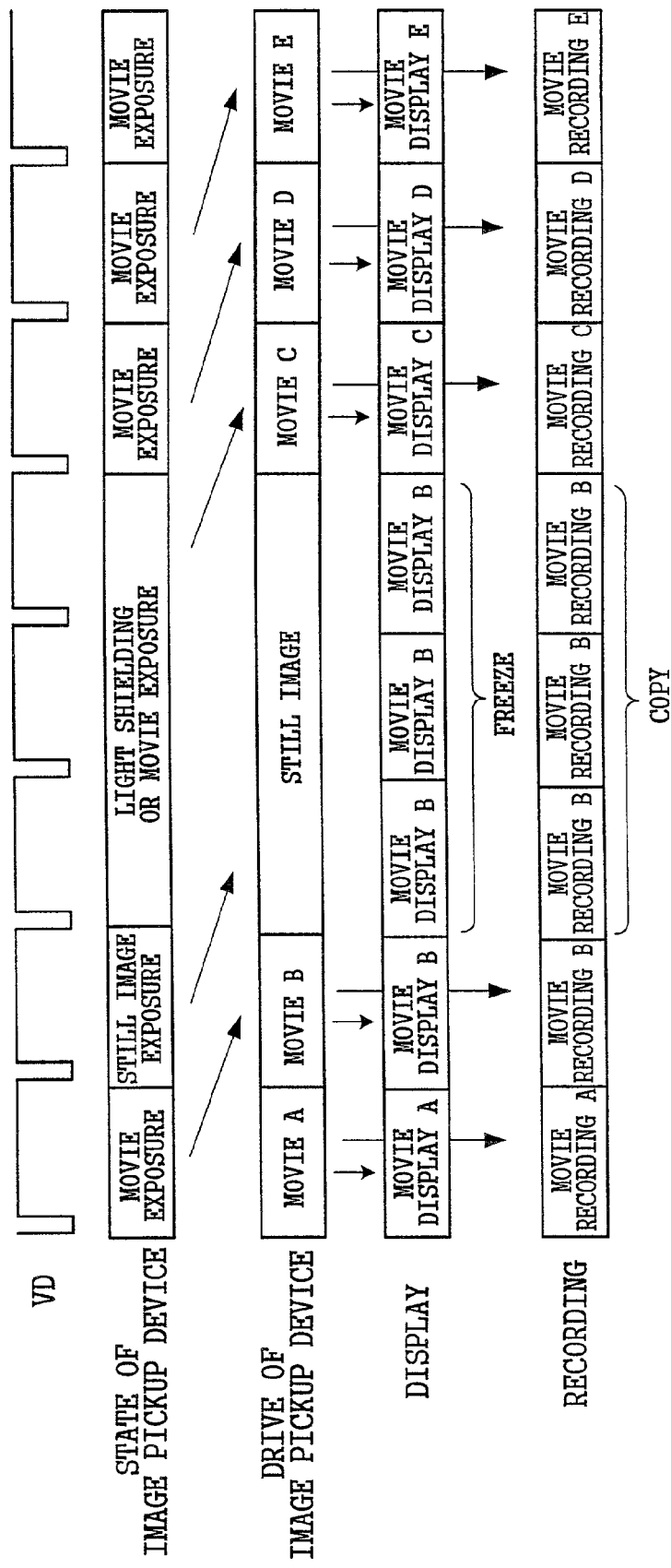
FIG. 2 is a timing chart showing a first control example in the camera according to the embodiment.

FIG. 2 is a timing chart showing a first control example in the camera 10. In the figure, an operation in the case where the still image capturing interrupts the movie capturing is indicated. During the movie display, an exposure is performed in synchronization with the VD signal and the signal charges accumulated as a result of the exposure are read in the next 1V period. According to FIG. 2, a movie display A is carried out based on the data read in a drive period indicated as movie A. The signal charges accumulated by the exposure within the drive period are read in the drive period (movie B) that synchronizes with the next VD signal. Based on the data read in the drive period indicated as movie B, a movie display B is carried out.

If an instruction for still image recording is provided in the movie display and an exposure for still image recording is performed in the drive period indicated as movie B, reading processing and recording processing of still image data are carried out in the next 3V period. Because capturing of the image data for the movie display is not performed during this period, the content of the immediately preceding display (movie display B) is repeatedly displayed. Accordingly, the display screen enters a suspend (freeze) condition.

The movie exposure is resumed in the last 1V period of the still image drive period (3V period), and the signal charges accumulated by the exposure are read in a drive period (movie C) that synchronizes with the next VD signal. Based on the data read in the drive period indicated as movie C, a movie display C is carried out. Subsequently, an exposure, reading for movie D and a display thereof (movie display D), an exposure, reading for movie E and a display thereof (movie display E), . . . are performed in the same way.

As to the recording operation in the case where the movie recording is interrupted by the still image capturing, like the above-described display operation, a movie recording A is performed for the image data read in a drive period indicated as movie A and a movie recording B is performed for the image data read in a drive period indicated as movie B. During the still image drive period not to capture the moving image data, the content of immediately preceding recording (movie recording B) is repeatedly recorded. When the still image drive period expires and the movie exposure is resumed, a movie recording C is performed for the data read in a drive period indicated as movie C, and subsequently, movie recording D, movie recording E, . . . are performed.

Therefore, if capturing of the still image is carried out in movie capturing, the display screen does not become black display (blackout), thus enabling to avoid unnaturalness in movie display. Because one screen is captured at 1V or 2V rate in movie capturing, application of the present invention is particularly effective in the case where the time period of 3V or more is required for capturing the still image.

Figure 3:
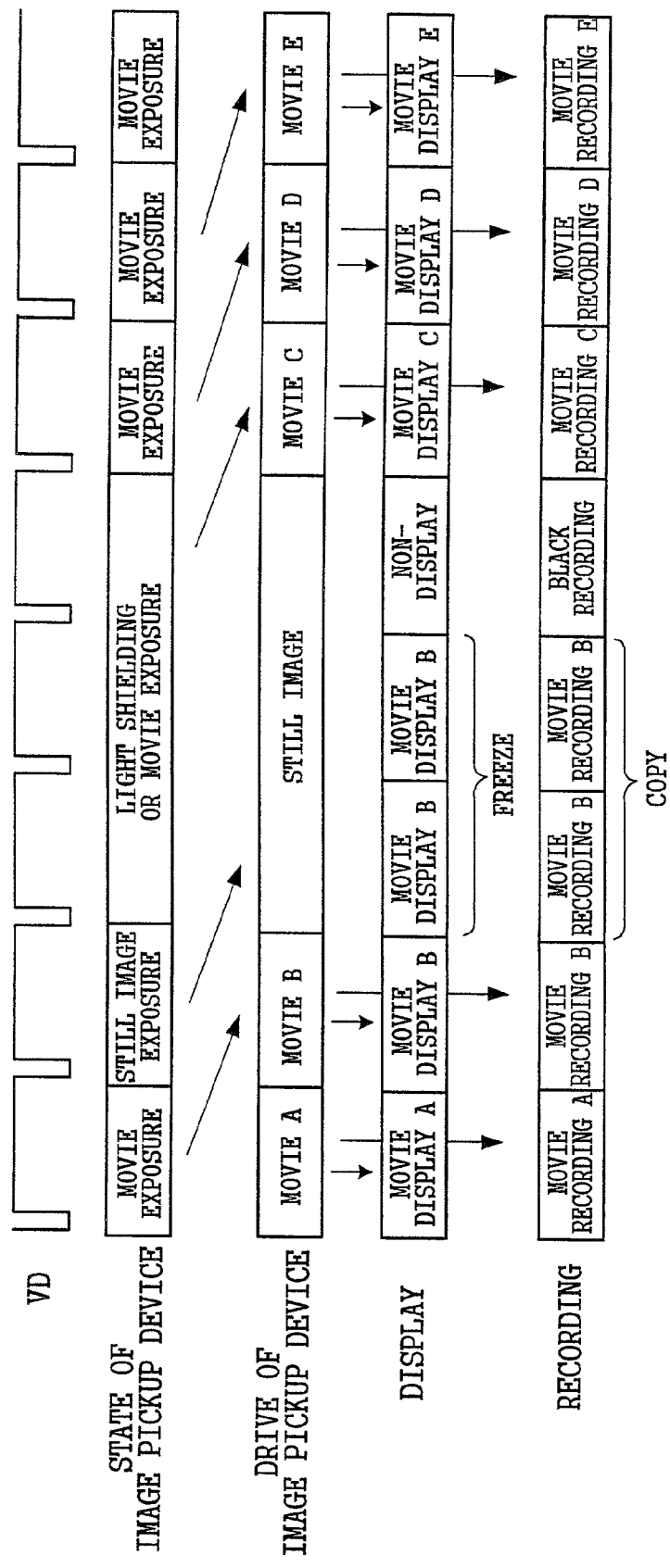
FIG. 3 is a timing chart showing a second control example in the camera according to the embodiment.

FIG. 3 is a timing chart showing a second control example in the camera 10. The control method shown in FIG. 3 differs from that of FIG. 2 in that, for the last 1V period of the still image drive period, blackout ("non-display") is inserted in the display processing and black screen recording ("black recording") is inserted in the recording processing.

As shown in FIG. 3, by repeatedly displaying (or recording) the data related to the immediately preceding display (or recording) and inserting "non-display" or "black recording" during the period of non-reading of movie data, a feeling of pressing down the release button for instructing the still image recording can be expressed.

Figure 4:
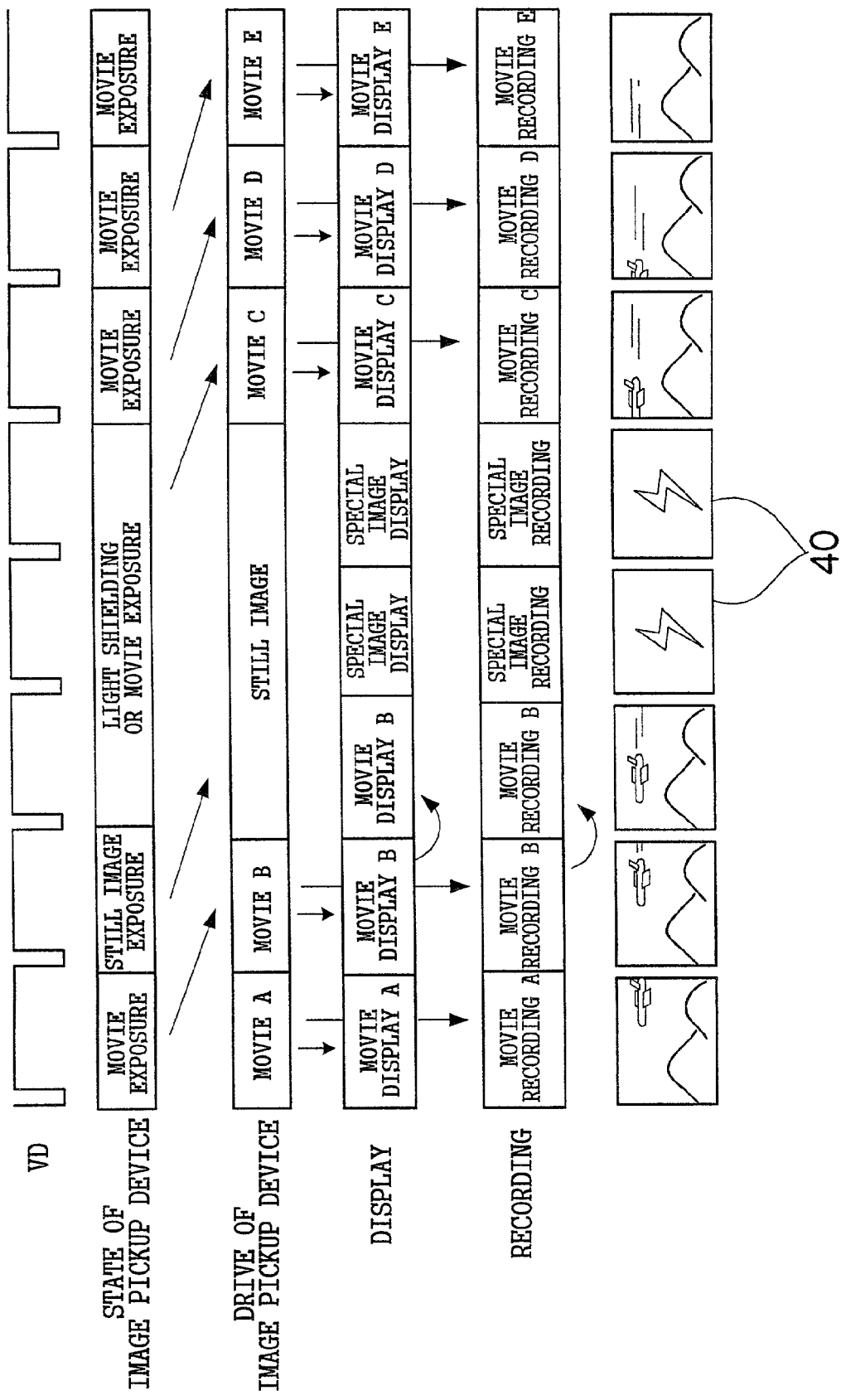
FIG. 4 is a timing chart showing a third control example in the camera according to the embodiment.
Figure 5:
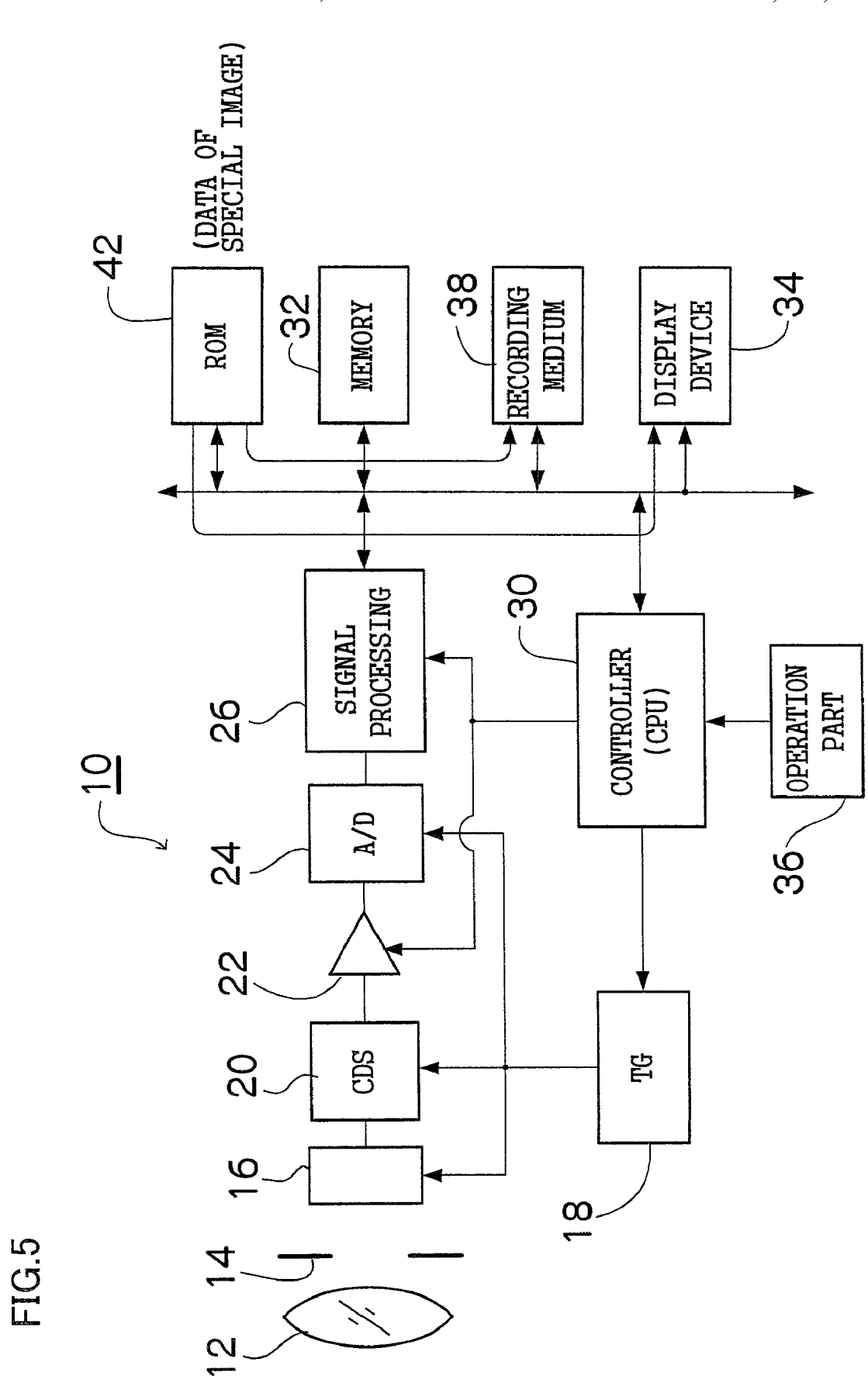
FIG. 5 is a block diagram showing a configuration of the camera for achieving the control method shown in FIG. 4.

FIG. 4 is a timing chart showing a third control example in the camera 10. The control method shown in FIG. 4 replaces the parts of "non-display" and "black recording" in the control method of FIG. 3 with display and recording of a predetermined special image screen. As the special image, for example, an image 40 that gives an impression that the release button is pressed down may be used. FIG. 5 shows a configuration for achieving the control method shown in FIG. 4. In FIG. 5, parts common to FIG. 1 are assigned the same reference characters and explanation thereof will be omitted. Image data for the special image (data of image 40 shown in FIG. 4) is stored in a ROM 42. When the special image is displayed and recorded, the image data is read from the ROM 42 and transmitted to the display device 34 or recording medium 38.

Figure 6:
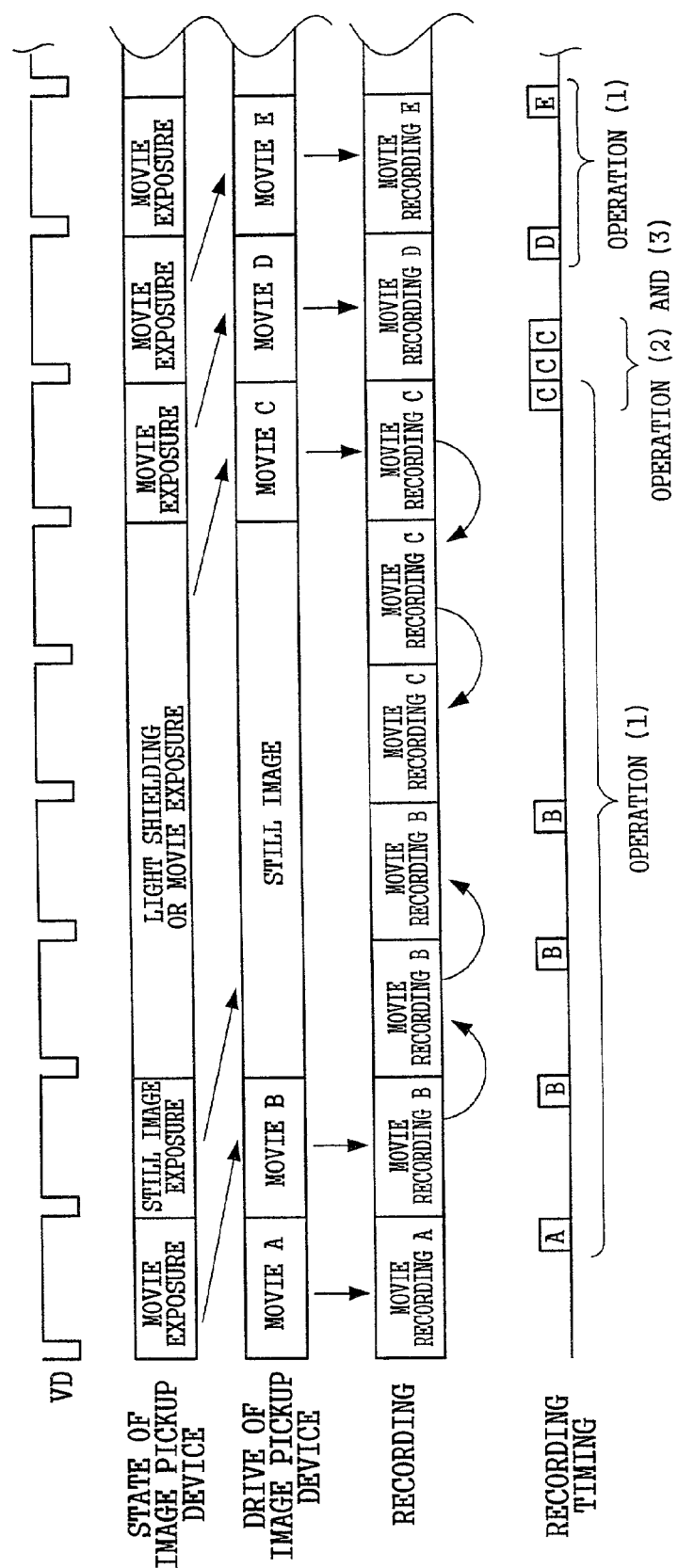
FIG. 6 is a timing chart showing a fourth control example in the camera according to the embodiment.
Figure 7:
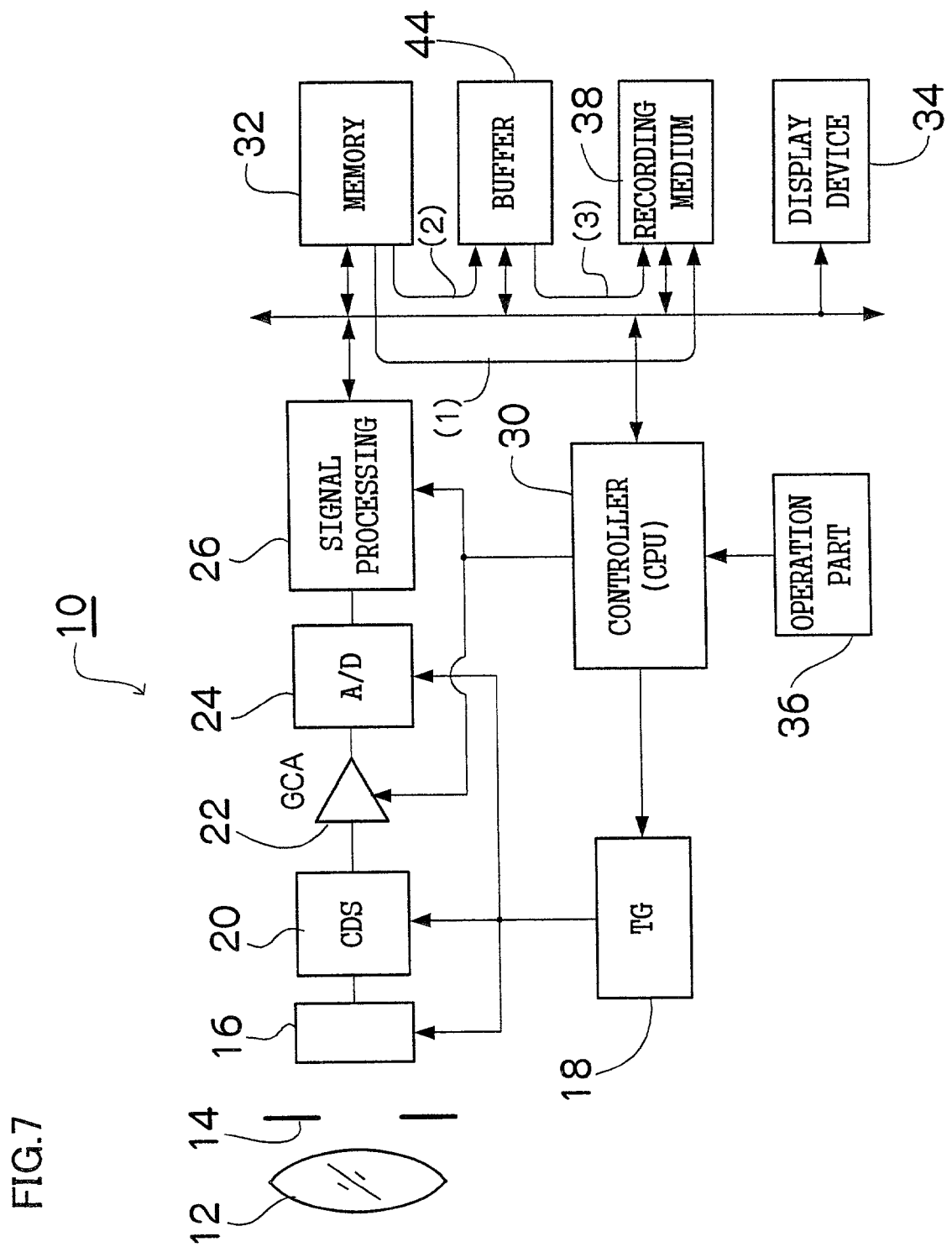
FIG. 7 is a block diagram showing a configuration of the camera for achieving the control method shown in FIG. 6.

FIG. 6 is a timing chart showing a fourth control example in the camera 10 and FIG. 7 shows a configuration for achieving the fourth control example shown in FIG. 6. According to FIG. 7, in addition to the configuration of FIG. 1, a buffer 44 that temporarily stores a movie image is provided. The other parts in FIG. 7 common to FIG. 1 are assigned the same reference characters, and explanation thereof will be omitted.

The control method shown in FIG. 6 replaces the part of "black recording" in the control method shown in FIG. 3 with recording of data for movie C obtained immediately after the capturing of movie is resumed.

If the period of non-capturing of the movie data becomes longer (in the example of FIG. 6, the still image drive period is 4V), repeated recording of data related to immediately preceding movie drive (movie B) throughout the period results in a long freeze time in movie reproduction, thus causing a feeling of discontinuity. Therefore, as shown in FIG. 6, by utilizing data obtained in movie drive (movie C) immediately after the movie drive is resumed, recording of the data is performed while retracing several V periods (in FIG. 6, 2V periods).

The recording timing of image will be described. As to the movie recording A and movie recording B shown in FIG. 6, an operation of writing the image data held in the memory 32 to the recording medium 38 is performed (operation (1)).

After repeating of the movie recording B, the movie recording operation is temporarily suspended, and in the first movie drive (movie C) after the still image drive, an operation of writing the image data related to the movie C held in the memory 32 to the recording medium 38 is performed (operation (1)). At this time, the data in the memory 32 is transferred to the buffer 44, and the image data related to the movie C is once stored in the buffer 44 (operation (2)). Upon retracing the non-recording 2V period, the image data in the buffer 44 is repeatedly recorded during the non-recording period (operation (3)). After that, the process returns to the normal recording pattern (operation (1)), where movie recording D, movie recording E, . . . are performed.

Figure 8:
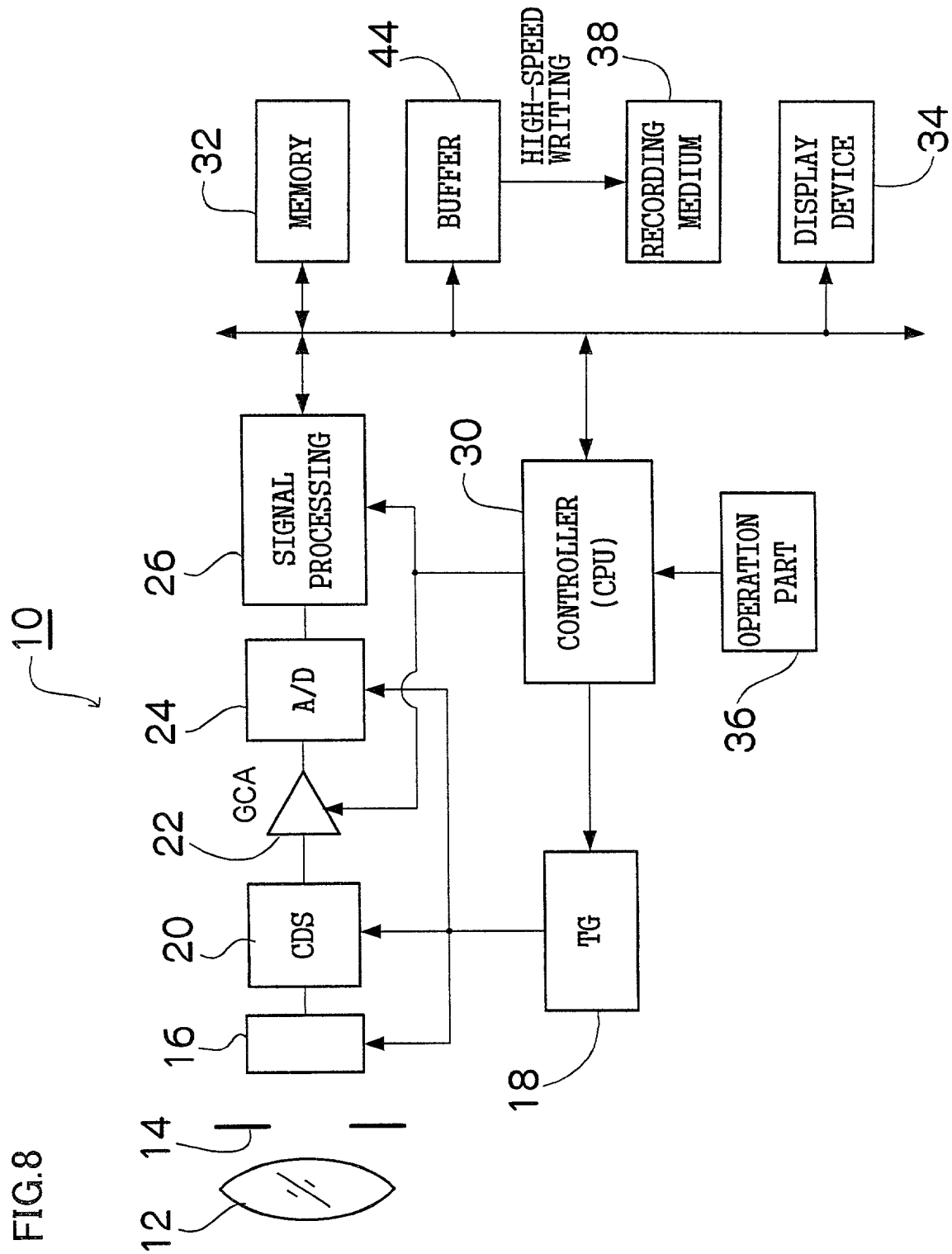
FIG. 8 is a block diagram showing another configuration example of the camera for achieving the control method shown in FIG. 6.

Instead of the control method with the above-described recording timing, the whole movie image data may be once stored in the buffer 44, and after the movie capturing is completed, the data in the buffer 44 may be written to the recording medium 38 at high speed as shown in FIG. 8. At this time, with respect to the frames corresponding to the movie recording B and movie recording C, the recording is repeatedly performed by the necessary number of frames.

Figure 9:
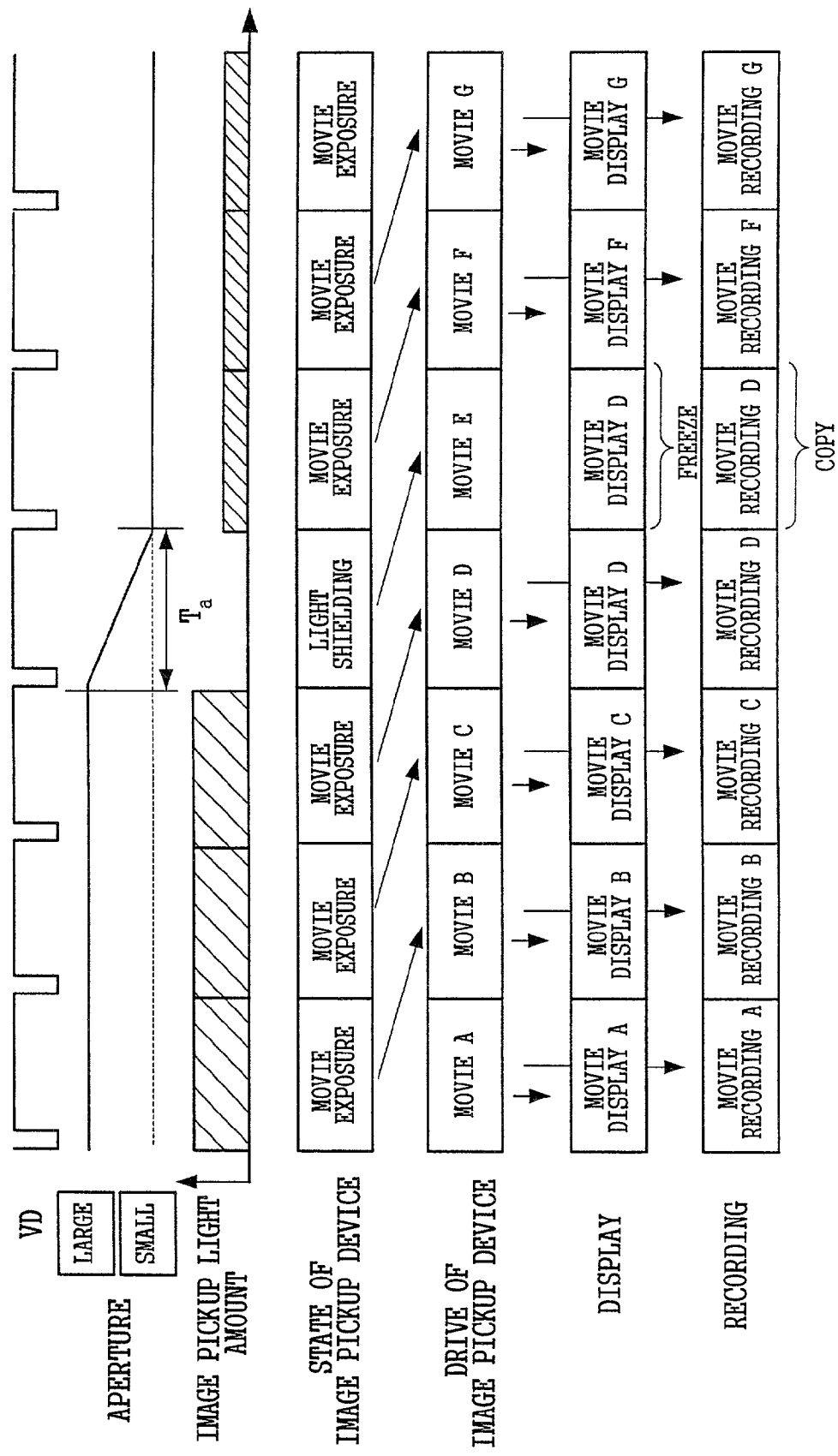
FIG. 9 is a timing chart showing a fifth control example in the camera according to the embodiment.

FIG. 9 is a timing chart showing a fifth control example in the camera 10. In the figure, a control example is shown in the case where the apertures are switched in capturing of the moving image. At first the movie capturing is performed with the aperture of large opening diameter ("large aperture"), and according to the drive of the movies A to D, the movie display A to D and movie recording A to D are performed. If the apertures are switched in the 1V period shown as Ta (drive period for movie D) and changed into the aperture of small opening diameter ("small aperture"), the movie exposure is interrupted for this period, and accordingly, image data cannot be obtained by the drive of movie E.

Therefore, by utilizing a picked-up image of 1V before (image data related to the drive of movie D in FIG. 9) instead of a picked-up image immediately after the apertures are switched, display (movie display D) and recording (movie recording D) are performed. Thus, discontinuity in the moving image is eliminated.

Figure 10:
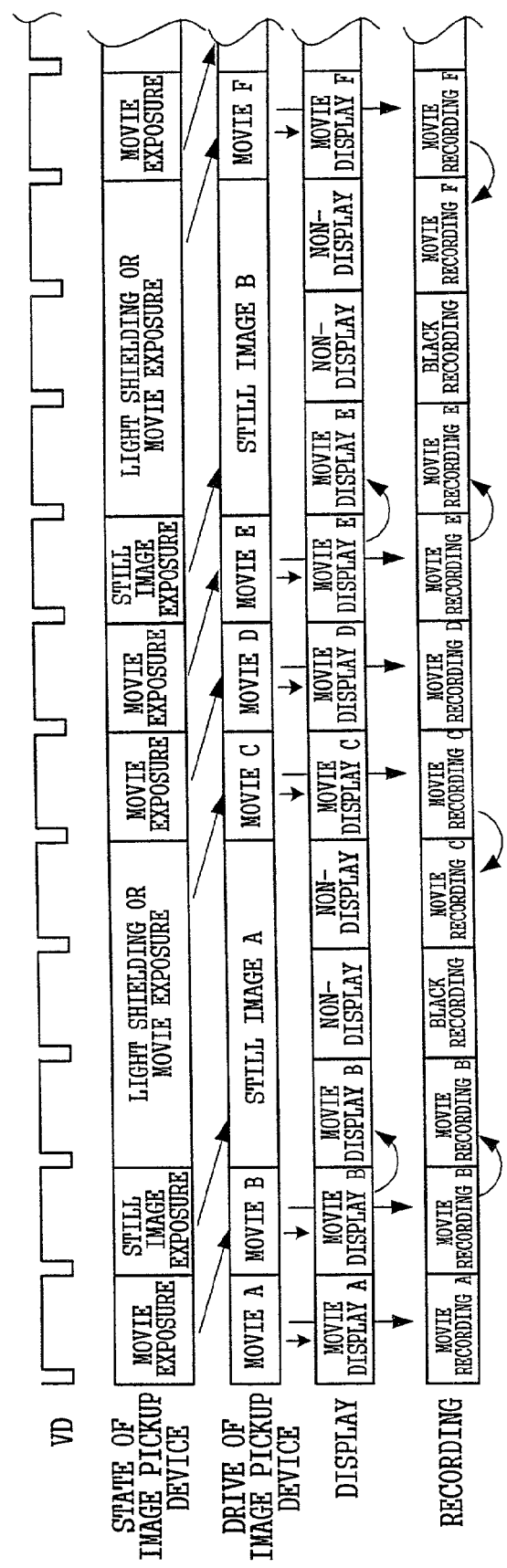
FIG. 10 is a timing chart showing a sixth control example in the camera according to the embodiment.
Figure 11:
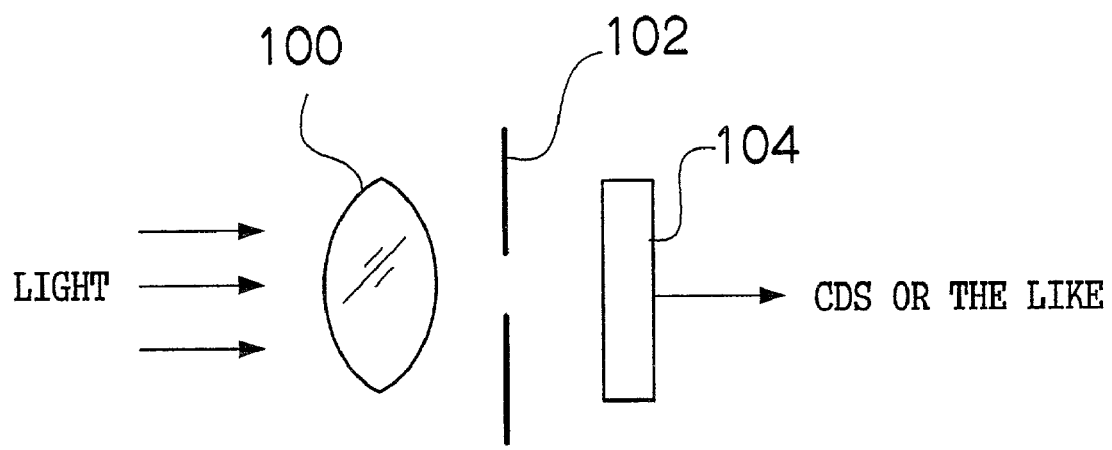
FIG. 11 shows a configuration of an image pickup part of the digital camera.
Figure 12:
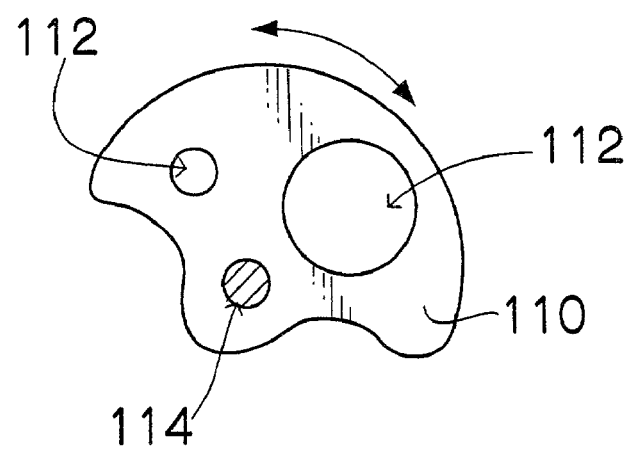
FIG. 12 shows an example of a turret-type aperture mechanism.
Figure 13:
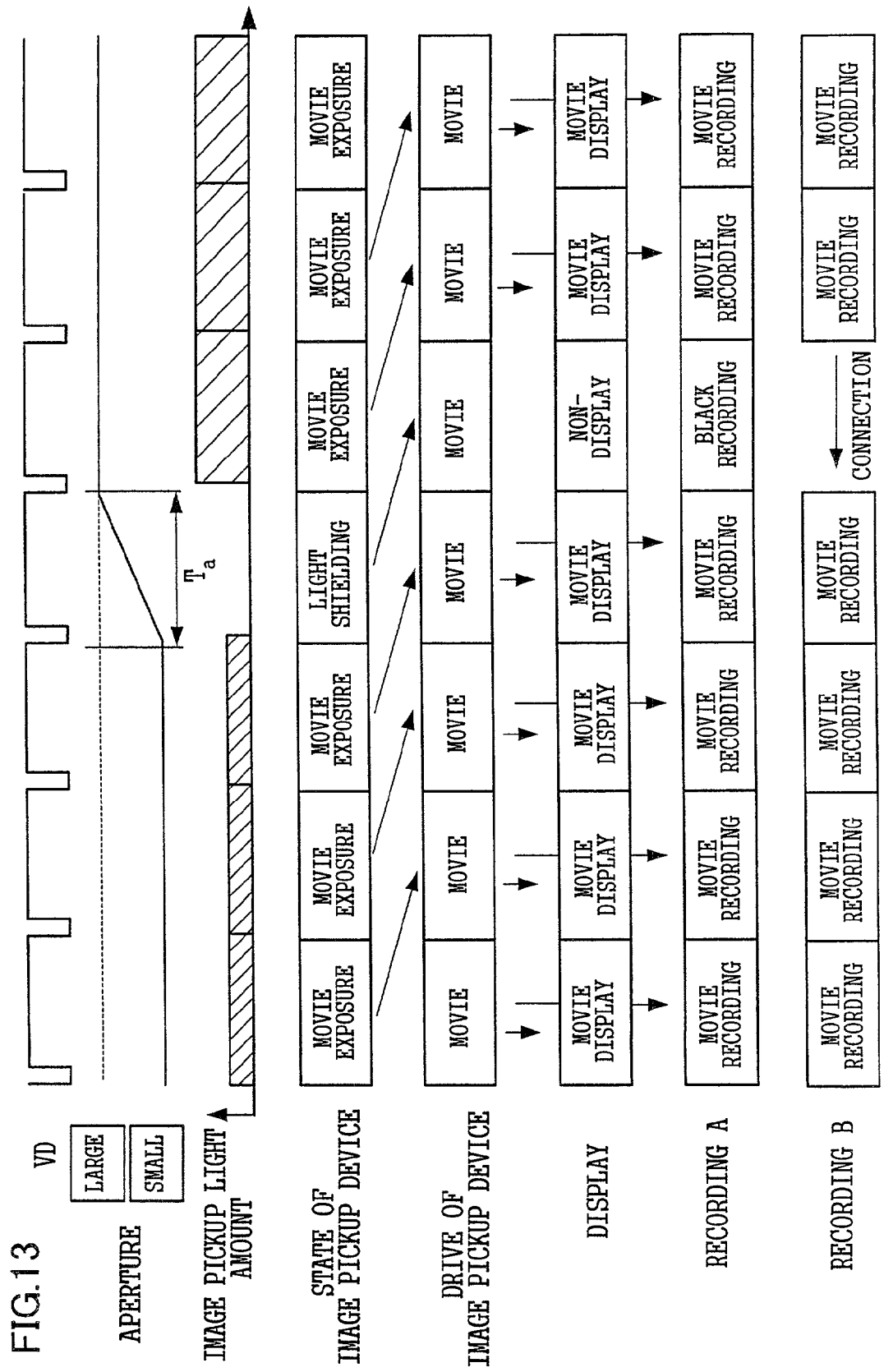
FIG. 13 is a timing chart showing a control example of moving image display and recording when apertures are switched in a conventional digital camera.
Figure 14:
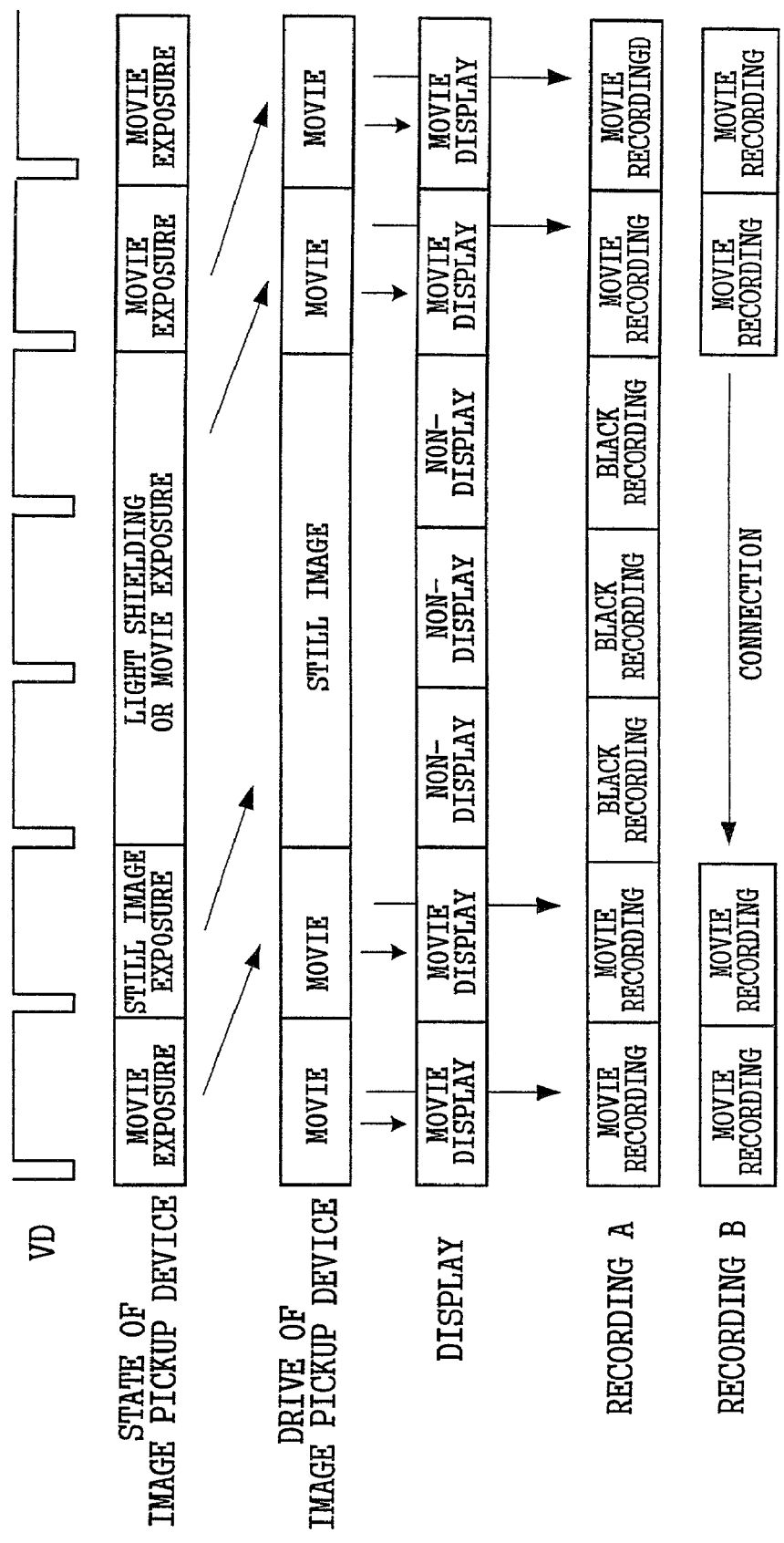
FIG. 14 is a timing chart showing a control example of moving image display and recording when interruption by capturing still image is made in conventional digital camera.

FIG. 10 is a timing chart showing a sixth control example in the camera 10. In the figure, a control example is shown in the case where intermittent capturing of the still image is performed. If the intermittent capturing of the still image is performed simultaneously with the moving image capturing, the moving image data cannot be obtained during the period of drive for capturing still image A (3V period in FIG. 10). Therefore, like the example shown in FIG. 3, the freeze display is carried out by repeatedly displaying the immediately preceding picked-up image (the image data obtained by the drive of movie B in FIG. 10). In FIG. 10, in 3V period of not inputting the movie image, the movie display B is performed in the first 1V period, and "non-display" is indicated in the subsequent 2V period. However, combination of the number of repetition of the movie display B and the number of repetition of "non-display" can be appropriately changed.

In case of moving image recording, in 3V period of not inputting the movie image, repeated recording (movie recording B) is performed by utilizing an immediately preceding picked-up image in the first 1V period, "black recording" is performed in the next 1V period, and in the last 1V period, like the example shown in FIG. 6, an immediately following picked-up image (the image data obtained by the drive of movie C) is recorded while retracing the time period.

When the period of capturing the still image expires, the process returns to the normal movie drive and the movie display C to E and movie recording C to E are carried out. After that the capturing of the still image B is started. During the period of the drive for capturing the still image B, the display processing and recording processing similar to those in the period of the drive for capturing the still image A as described above are performed.

It may be possible to perform display or recording of the special image explained with reference to FIG. 4 instead of performing "non-display" and "black recording". The intermission time (interval) in still image capturing and the length of the still image reading period are not limited to the example shown in FIG. 10 and can be appropriately changed.

According to the camera 10 of this embodiment, with respect to the period during which the reading of the movie image is interrupted, display or recording is repeatedly performed by utilizing an immediately preceding picked-up image, and as to the recording, supplementary recording in the non-recording period is performed afterward by utilizing the first image after resuming the reading of the movie image, thus removing the discontinuity in the moving image. Moreover, by inserting "non-display", "black recording", display or recording of a special image if necessary, an impression is given that a shutter is clicked. Furthermore, it may be possible to combine the control method shown in FIG. 10 and the control method in conjunction with the aperture switching explained with reference to FIG. 9.

As described above, according to the present invention, with respect to the period during which the capturing of the image data of moving image is interrupted by performing the still image capturing in moving image display or moving image recording, an image picked-up immediately before the interruption is repeatedly displayed or recorded, and therefore, the unnaturalness in the moving image display or recording can be eliminated.

Moreover, according to the present invention, with respect to the period during which the capturing of the image data of moving image is interrupted in conjunction with the aperture switching, display or recording is performed by utilizing an image picked-up immediately before the interruption, thus removing the discontinuity in moving image.

Likewise, with respect to the period during which the capturing of the image data of moving image is interrupted, recording for the period is performed by utilizing an image picked-up immediately after the capturing of the moving image data is resumed, thus removing the discontinuity in moving image.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An electronic camera, comprising:
    an image pickup device which converts an optical image into an electric signal;
    a signal processing device which converts image data read from the image pickup device into a display signal and outputs the display signal to an image display device; and
    a display control device which causes the image display device to display a moving image based on the image data captured by driving the image pickup device at a predetermined period, and as a result of a period during which any image data of the moving image is not captured in display operation of the moving image, causes the image display device to repeatedly display a picked-up image captured immediately before.

2. The electronic camera according to claim 1, wherein the display control device inserts a non-image screen of one or more frame periods after the repeated display.

3. The electronic camera according to claim 1, further comprising:
    a special image storing device which stores data of a special image to be displayed on the image display device instead of the moving image in case of occurrence of a period during which any image data of the moving image is not captured,
    wherein the display control device causes the image display device to display the special image stored in the special image storing device for one or more frame periods after the repeated display.

4. The electronic camera according to claim 1, wherein the period during which any image data of the moving image is not captured occurs in a case where still image capturing processing is performed in the moving image capturing.

5. The electronic camera according to claim 1, wherein the period during which any image data of the moving image is not captured occurs in a case where an aperture is changed in the moving image capturing.

6. The electronic camera of claim 1, wherein the period during which any image data of the moving image is not captured corresponds to a period where the signal processing device does not convert the image data from the image pickup device.

7. An electronic camera, comprising:
    an image pickup device which converts an optical image into an electric signal;
    a signal processing device which converts image data read from the image pickup device into a display signal and outputs the display signal to an image display device;
    a display control device which causes the image display device to display a moving image based on the image data obtained by driving the image pickup device at a predetermined period; and
    a special image storing device which stores data of a special image to be displayed instead of the moving image in case of occurrence of a period during which image data necessary for displaying the moving image is not obtained,
    wherein the display control device causes the image display device to display the special image stored in the special image storing device in case of occurrence of a period during which the image data of the moving image is not obtained in display operation of the moving image.

8. The electronic camera according to claim 7, wherein the period during which any image data of the moving image is not obtained occurs in a case where still image capturing processing is performed in the moving image capturing.

9. The electronic camera according to claim 7, wherein the period during which any image data of the moving image is not obtained occurs in a case where an aperture is changed in the moving image capturing.

10. The electronic camera of claim 7, wherein the period during which any image data of the moving image is not obtained corresponds to a period where the signal processing device does not convert the image data from the image pickup device.

11. An electronic camera, comprising:
    an image pickup device which converts an optical image into an electric signal;
    a recording processing device which converts image data read from the image pickup device into recording data and records the recording data on a recording medium; and
    a recording control device which controls the recording processing device to record a moving image on the recording medium, the moving image being shown by the image data captured by driving the image pickup device at a predetermined period, and as a result of a period during which any image data of the moving image is not captured in capturing the moving image, to cause the recording processing device to repeatedly record a picked-up image captured immediately before.

12. The electronic camera according to claim 11, wherein the recording control device performs control to record a non-image screen of one or more frame periods after the repeated recording.

13. The electronic camera according to claim 11, further comprising:

a special image storing device which stores data of a special image to be recorded instead of a picked-up image in case of occurrence of a period during which any image data of the moving image is not captured, wherein the recording control device performs control to record the special image stored in the special image storing device for one or more frame periods after the repeated recording.

14. The electronic camera according to claim 11, wherein when the period during which any image data of the moving image is not captured expires and obtaining of the image data of the moving image is resumed, the recording control device performs control to repeatedly record a picked-up image obtained immediately after resumption of obtaining the image data for one or more frame periods including a last frame of the period during which any image data of the moving image is not captured.

15. The electronic camera according to claim 11, wherein the period during which any image data of the moving image is not captured occurs in a case where still image capturing processing is performed in the moving image capturing.

16. The electronic camera according to claim 11, wherein the period during which any image data of the moving image is not captured occurs in a case where an aperture is changed in the moving image capturing.

17. The electronic camera of claim 11, wherein the period during which any image data of the moving image is not captured corresponds to a period where the recording processing device does not convert the image data from the image pickup device.

18. An electronic camera, comprising:
an image pickup device which converts an optical image into an electric signal;
a recording processing device which converts image data read from the image pickup device into recording data and records the recording data on a recording medium;
a recording control device which controls the recording processing device to record a moving image on the recording medium, the moving image being shown by the image data obtained by driving the image pickup device at a predetermined period; and
a special image storing device which stores data of a special image to be recorded instead of a picked-up image in case of occurrence of a period during which any image data of the moving image is not obtained in capturing the moving image,
wherein the recording control device performs control to record the special image stored in the special image storing device on the recording medium in case of occurrence of a period during which any image data of the moving image is not obtained in capturing the moving image.

19. The electronic camera according to claim 18, wherein when the period during which any image data of the moving image is not obtained expires and obtaining of the image data of the moving image is resumed, the recording control device performs control to repeatedly record a picked-up image immediately after resumption of obtaining the image data for one or more frame periods including a last frame of the period during which any image data of the moving image is not obtained.

20. The electronic camera according to claim 18, wherein the period during which any image data of the moving image is not obtained occurs in a case where still image capturing processing is performed in the moving image capturing.

21. The electronic camera according to claim 18, wherein the period during which any image data of the moving image is not obtained occurs in a case where an aperture is changed in the moving image capturing.

22. The electronic camera of claim 18, wherein the period during which any image data of the moving image is not obtained corresponds to a period where the recording processing device does not convert the image data from the image pickup device.

23. An electronic camera, comprising:
an image pickup device which converts an optical image into an electric signal;
a recording processing device which converts image data read from the image pickup device into recording data and records the recording data on a recording medium; and
a recording control device which controls the recording processing device to record a moving image on the recording medium, the moving image being shown by the image data obtained by driving the image pickup device at a predetermined period, and in case of occurrence of a period during which any image data of the moving image is not obtained in capturing the moving image, with respect to the moving image recording for the period, causing the recording processing device repeatedly record a picked-up image obtained immediately after resumption of obtaining the image data of the moving image for one or more frame periods including a last frame period of the period during which any image data of the moving image is not obtained.

24. The electronic camera according to claim 23, wherein the period during which any image data of the moving image is not obtained occurs in a ease where still image capturing processing is performed in the moving image capturing.

25. The electronic camera according to claim 23, wherein the period during which any image data of the moving image is not obtained occurs in a case where an aperture is changed in the moving image capturing.

26. The electronic camera of claim 23, wherein the period during which any image data of the moving image is not obtained corresponds to a period where the recording processing device does not convert the image data from the image pickup device.

27. An image display method applied to an electronic camera capable of displaying a subject image as a moving image on an image display device, the subject image being picked up by an image pickup device, the method comprising the step of:
displaying a moving image on the image display device based on image data captured by driving the image pickup device at a predetermined period, and as a result of a period during which any image data of the moving image is not captured in display operation of the moving image, repeatedly displaying a picked-up image captured immediately before on the image display device.

28. The image display method according to claim 27, wherein a non-image screen of one or more frame periods is displayed after the repeated display.

29. The image display method according to claim 27, wherein a predetermined special image is displayed for one or more frame periods after the repeated display.

30. The image display method of claim 27, wherein the period during which any image data of the moving image is not captured corresponds to a period where the image display device does not capture the subject image picked up by the image pickup device.

31. An image display method applied to an electronic camera capable of displaying a subject image as a moving image on an image display device, the subject image being picked up by an image pickup device, the method comprising the step of:

displaying a moving image on the image display device based on image data obtained by driving the image pickup device at a predetermined period, and in case of occurrence of a period during which any image data of the moving image is not obtained in display operation of the moving image, displaying a predetermined special image on the image display device instead of the moving image.

32. The image display method of claim 31, wherein the period during which any image data of the moving image is not obtained corresponds to a period where the image display device does not obtain the subject image picked up by the image pickup device.

33. An image recording method applied to an electronic camera capable of recording a subject image as a moving image on a recording medium, the subject image being picked up by an image pickup device, the method comprising the step of:

recording a moving image on the recording medium, the moving image being shown by image data captured by driving the image pickup device at a predetermined period, and as a result of a period during which any image data of the moving image is not captured in capturing the moving image, repeatedly recording a picked-up image captured immediately before.

34. The image recording method according to claim 33, wherein a non-image screen of one or more frame periods is recorded after the repeated recording.

35. The image recording method according to claim 33, wherein a predetermined special image is recorded for one or more frame periods after the repeated recording.

36. The image recording method according to claim 33, wherein when the period during which any image data of the moving image is not captured expires and capturing the image data of the moving image is resumed, repeatedly recording a picked-up image captured immediately after resumption of capturing the image data for one or more frame periods including a last frame period of the period during which any image data of the moving image is not captured.

37. An image recording method applied to an electronic camera capable of recording a subject image as a moving image on a recording medium, the subject image being picked up by an image pickup device, the method comprising the step of:

recording a moving image on the recording medium, the moving image being shown by image data obtained by driving the image pickup device at a predetermined period, and in case of occurrence of a period during which any image data of the moving image is not obtained in capturing the moving image, recording a predetermined special image instead of the moving image.

38. The image recording method of claim 37, wherein the period during which any image data of the moving image is not obtained corresponds to a period where the moving image is not captured from the image pickup device.

39. An image recording method applied to an electronic camera capable of recording a subject image as a moving image on a recording medium, the subject image being picked up by an image pickup device, the method comprising the step of:

recording a moving image on the recording medium, the moving image being shown by image data obtained by driving the image pickup device at a predetermined period, and in case of occurrence of a period during which any image data of the moving image is not obtained in capturing the moving image, recording a predetermined special image, wherein when the period during which any image data of the moving image is not obtained expires and obtaining the image data of the moving image is resumed, repeatedly recording a picked-up image obtained immediately after resumption of obtaining the image data for one or more frame periods including a last frame period of the period during which any image data of the moving image is not obtained.

40. The image recording method of claim 39, wherein the period during which any image data of the moving image is not obtained corresponds to a period where the moving image is not captured from the image pickup device.

41. An image recording method applied to an electronic camera capable of recording a subject image as a moving image on a recording medium, the subject image being picked up by an image pickup device, the method comprising the step of:

recording a moving image on the recording medium, the moving image being shown by image data obtained by driving the image pickup device at a predetermined period, and in case of occurrence of a period during which any image data of the moving image is not obtained in capturing the moving image, repeatedly recording a picked-up image obtained immediately after resumption of obtaining the image data of the moving image for one or more frame periods including a last frame period of the period.

42. The image recording method of claim 41, wherein the period during which any image data of the moving image is not obtained corresponds to a period where the moving image is not captured from the image pickup device.

* * * * *